United States Patent [19]

Ward

[11] Patent Number: 4,588,808

[45] Date of Patent: May 13, 1986

[54] TWO-STAGE PROCESS AND PRODUCT FOR PRODUCING POLYBENZIMIDAZOLES FROM FREE DICARBOXYLIC ACIDS

[75] Inventor: Bennett C. Ward, Pineville, N.C.

[73] Assignee: Celanese Corporation, New York, N.Y.

[21] Appl. No.: 645,952

[22] Filed: Aug. 31, 1984

[51] Int. Cl.[4] ............................................. C08G 73/18
[52] U.S. Cl. ................... 528/337; 528/341; 528/342
[58] Field of Search ....................... 528/342, 337, 341

[56] References Cited

U.S. PATENT DOCUMENTS

| | | | |
|---|---|---|---|
| 2,895,948 | 7/1959 | Brinker | 528/342 |
| 3,408,336 | 10/1968 | Benson | 528/342 |
| 4,448,687 | 5/1984 | Wang | 528/342 |
| 4,463,167 | 7/1984 | Choe | 528/342 |
| 4,483,977 | 11/1984 | Conciatori | 528/342 |

*Primary Examiner*—C. Warren Ivy
*Attorney, Agent, or Firm*—Robert J. Blanke

[57] ABSTRACT

A two stage process for the production of polybenzimidazoles and a novel polybenzimidazole produced there by is provided wherein a mixture of an aromatic tetraamine, e.g., 3,3',4,4'-tetraaminobiphenyl and a free dicarboxylic acid, e.g., isophthalic acid, is heated with agitation in a first stage to a temperature above the melting point of the tetraamine until the viscosity of the mixture rises as indicated by an agitator torque of at least 1.5 times that before the rise in viscosity. The agitation is then discontinued and the reaction mixture is allowed to foam while heating is continued. The foam is then allowed to cool to a friable mass and is crushed to a ground prepolymer which is heated with agitation in a second stage until the desired polymer is obtained. The novel polybenzimidazole produced is the reaction product of phenylindandicarboxylic acid and 3,3',4,4'-tetraaminobiphenyl.

8 Claims, No Drawings

TWO-STAGE PROCESS AND PRODUCT FOR PRODUCING POLYBENZIMIDAZOLES FROM FREE DICARBOXYLIC ACIDS

BACKGROUND OF THE INVENTION

The present invention provides a two-stage melt polymerization process for the production of high molecular weight polybenzimidazoles utilizing a free aromatic dicarboxylic acid as monomer.

High molecular weight polybenzimidazoles are polymers of high thermal stability and excellent resistance to oxidative or hydrolytic degradation, which can be formed into shaped articles such as fibers and films having very desirable physical properties. As taught by the published literature, these polymers may be prepared, for example, by melt polymerizing an aromatic tetraamine and a diphenylester or an anhydride of an aromatic or heterocyclic dicarboxylic acid in one or two stage process; see, for example H. Vogel and C. S. Marvel, Journal of Polymer Science, Vol. L, pages 511–539 (1961); and U.S. Pat. Nos. Re. 26,065; 3,174,947; 3,509,108; 3,551,389; 3,433,772; and 3,655,632. In particular, U.S. Pat. No. 3,555,389 discloses a two-stage process for the production of aromatic polybenzimidazoles, in which the monomers are heated at a temperature above 170° C. in a first stage melt polymerization zone until a foamed prepolymer is formed. The foamed prepolymer is cooled, pulverized, and introduced into a second stage polymerization zone where it is heated again to yield a polybenzimidazole polymer product.

It has also been known to prepare polybenzimidazoles from the free dicarboxylic acid rather than the phenyl esters or anhydrides in a melt polymerization process. However, many of the early investigators of these polymers believed that inferior or unsatisfactory polymers resulted from the use of the free acid as the monomer. Thus Vogel and Marvel state in their cited article that in attempting to prepare polybenzimidazoles from aromatic dioic acids and aromatic tetraamines, "The use of the free acids and the corresponding dimethyl esters gave inferior results." (page 513) Moreover, these same two investigators do not mention the free acids as monomers in their U.S. Pat. No. 3,174,947 in which polybenzimidazoles are disclosed and claimed, nor are the free acids mentioned as possible monomers in any of the other cited patents.

In addition to the melt polymerization process described in the foregoing references, a process of preparing polybenzimidazoles has been proposed in which good results are reported to be obtained using a free dicarboxylic acid as monomer. This process involves the solution polymerization of an inorganic acid salt of an aromatic tetraamine and a dicarboxylic acid or a derivative thereof with heat in the presence of polyphosphoric acid; (see U.S. Pat. No. 3,313,783 and Iwakura et al, Journal of Polymer Science: Part A, Vol. 2, pages 2605–2615 (1964). According to this process, the polymer product after completion of the reaction can be separated by pouring the reaction mixture in the form of a polyphosphoric acid solution into a large quantity of water. However, this separation procedure is complicated and, moreover, it is difficult to recover and reuse the polyphosphoric acid. Thus, this process is not generally considered satisfactory for the commercial production of polybenzimidazoles.

Despite the disadvantage of processes utilizing a free dicarboxylic acid as monomer in the preparation of polybenzimidazoles, there are concomitant advantages to such use over the phenyl esters which are the most widely taught dicarboxylic acid derivatives for the preparation of these polymers. Thus, the free acid is generally less expensive than the corresponding phenyl ester and its use does not result in the formation of free phenol as a by-product. The formation of free phenol is undesirable because of toxicity problems. In view of this there have been attempts to develop processes which utilize a free acid as monomer and result in polymers which can be formed into shaped articles of commercial utility. For example, U.S. Pat. No. 4,312,976 discloses a single-stage process of preparing polybenzimidazoles from a free dicarboxylic acid as monomer, wherein the catalyst is an organic sulfonic acid, a halogenated acetic acid or a non-oxidizing inorganic acid. However, aside from being limited to a specific class of catalysts, this process results in a polymer mass of high viscosity requiring substantial agitation energy especially in the latter part of the polymerization process. Furthermore, the final polymer is in the form of a solidified mass which is difficult to handle and to dissolve in a appropriate solvent for forming into shaped articles such as fibers.

SUMMARY OF THE INVENTION

In accordance with one aspect of this invention, polybenzimidazoles are prepared by reacting at least one aromatic tetraamine containing two pairs of amine substituents on an aromatic ring, the amine substituents being ortho to one another, with at least one free dicarboxylic acid in a two stage polymerization process. Certain of the polybenzimidazoles prepared are new compositions of matter. In the first stage of the process, the mixture of aromatic tetraamine and dicarboxylic acid and, if desired, a polymerization catalyst is heated to condensation polymerization temperatures which are above the melting point of the aromatic tetraamine. Depending on the nature and melting point of the dicarboxylic acid, the resulting polymerizing mass is a liquid which may be a slurry of solid acid particles in melted tetraamine, or a homogeneous mixture of tetraamine and acid or an emulsion comprising melted tetraamine and melted acid. The heating is continued to between 230°–350° C. with concurrent strong agitation until the viscosity of the mixture rises to a point such that the agitator torque is at above 1.5 times, and generally no higher than about 6 times, the torque before the increases in viscosity begins to occur. The agitation is then terminated, and heating is continued while allowing the mass to foam to a friable mass. The resulting prepolymer is then cooled and ground to a powder which is heated in the solid state in a second polymerization stage at a higher temperature than the first stage until the desired degree of polymerization is achieved.

DETAILED DESCRIPTION OF THE INVENTION

The polybenzimidazoles which can be produced by the process of this invention are those having repeating units of the following formula:

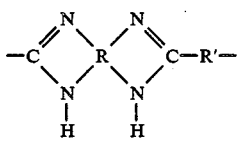

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran.

The following generalized equation illustrates the condensation reaction which occurs in forming the polybenzimidazoles having the recurring units of the foregoing formula:

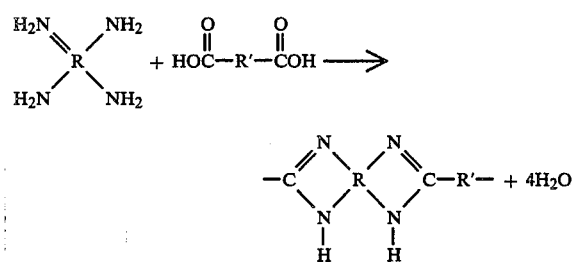

Such polybenzimidazoles are produced by the reaction of a mixture of (1) at least one aromatic tetraamine containing two groups of amine substituents, the amine substituents in each group being in an ortho position relative to each other, and (2) at least one dicarboxylic acid.

Aromatic tetraamines which may be used are those with the following formulas:

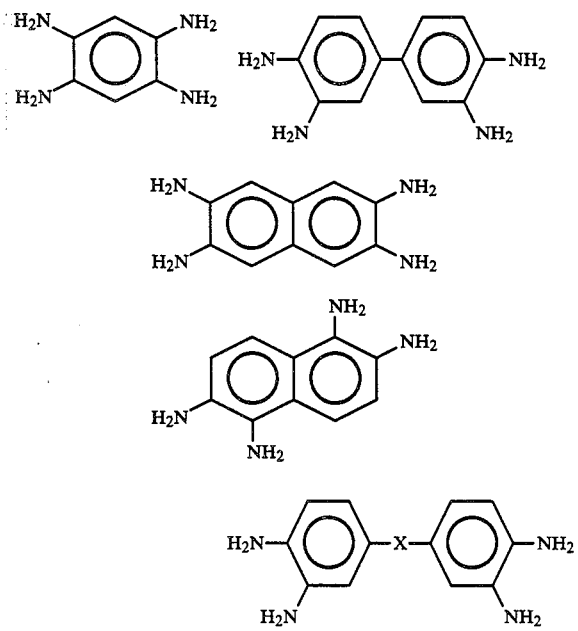

where X represents —O—, —S—, —SO$_2$, —C—, or a lower alkyl group, such as —CH$_2$—, —(CH$_2$)$_2$—, or —C(CH$_3$)$_2$—. Among such aromatic tetraamines may be mentioned, for example, 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-tetraaminodiphenyl ethane; 3,3',4,4$^2$-tetraminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The dicarboxylic acids which are suitable for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxyl groups are substituents upon carbon atoms in a ring compound such as pyridine, pyrazine, furan, quinoline, thiophene, and pyran.

The preferred dicarboxylic acids are aromatic dicarboxylic acids such as those illustrated below:

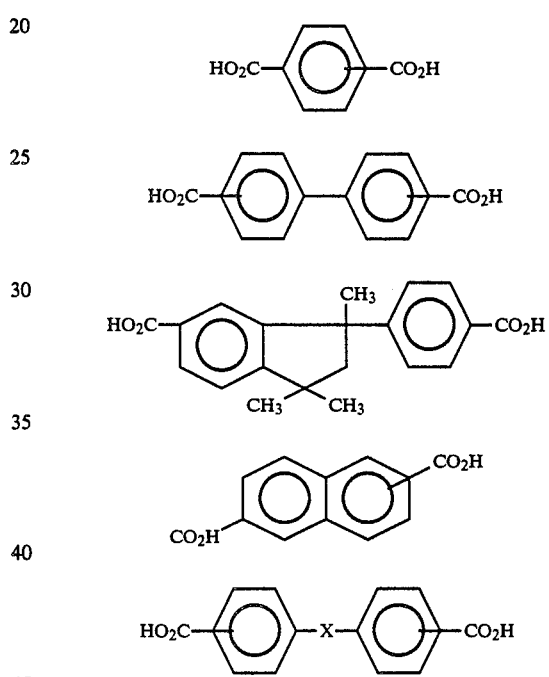

where X is as defined above. For example, the following diacids can suitably be employed: isophthalic acid; terephthalic acid; 4,4'-biphenyldicarboxylic acid; 1,4-naphthalenedicarboxylic acid; 2,2'-biphenyldicarboxylic acid; phenylindandicarboxylic acid; 1,6-naphthalenedicarboxylic acid; 2,6-naphthalenedicarboxylic acid; 4,4'-diphenyletherdicarboxylic acid; and 4,4'-diphenyletherdicarboxylic acid; 4,4'-diphenylmethanedicarboxylic acid; 4,4'-diphenylsulfonedicarboxylic acid; and 4,4'-diphenylthioetherdicarboxylic acid. Isophthalic acid is the dicarboxylic acid which is most preferred for use in the process of the present invention.

It is preferred to employ the dicarboxylic acid in a ratio of about 1 mole per mole of aromatic tetraamine. However, the optimal ratio of reactants in a particular polymerization system can be easily determined by one of ordinary skill in the art.

Examples of polybenzimidazoles which have the recurring structure of Formula I and which may be prepared according to the process of the present invention include:
poly-2,2'-(m-phenylene)-5,5'-bibenzimidazole;

poly-2,2'-(biphenylene-2''2''')-5,5'-bibenzimidazole;
poly-2,2'-(biphenylene-4''4''')-5,5'-bibenzimidazole;
poly-2,2'-(1'',3'',3''tramethylindanylene-6'',1''-phenylene-4''')-5,5'-bibenzimidazole;
poly-2,2'-(furylene-2'',5'')-5,5'-bibenzimidazole;
poly-2,2'-(naphthalene-1'',6'')-5,5'-bibenzimidazole;
poly-2,2'-(amylene-5,5'-bibenzimidazole);
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(bibenzimidazole)ether;
poly-2,2'-(m-phenylene)-5,5'-di(bibenzimidazole)sulfide;
poly-2,2'-(m-phenylene)-5,5'-di(bibenzimidazole)sulfone;
poly-2,2'-(m-phenylene)-5,5'-di(bibenzimidazole)methane;
poly-2,2''-(m-phenylene)-5,5''-di(bibenzimidazole)propane-2,2; and
poly-2,2''-(m-phenylene)-5,5''-di(bibenzimidazole)ethylene-1,2 where the double bonds of the ethylene groups are intact in the final polymer.

The preferred polybenzimidazole prepared by the process of the present invention is poly-2,2'-(m-phenylene)-5,5'-bibenzimidazole, the recurring unit of which is:

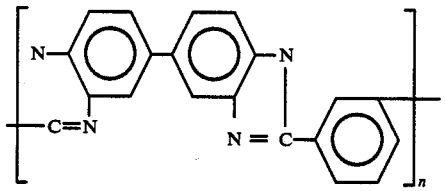

wherein n is an integer in excess of 75. This polymer can be prepared in accordance with the process of the present invention by the reaction of 3,3',4,4'-tetraaminobiphenyl with isophthalic acid.

The polymerization process of this invention can be carried out without a catalyst but it is preferable to have a catalyst present in order to increase intrinsic viscosity. Catalysts which may be used are, for example, phosphorus compounds such as triaryl phosphites and diarylphosphites in which the aryl groups may be, for example, phenyl, tolyl and substituted phenyl wherein the substituents may be, for example, alkyl and alkoxy containing up to 4 carbon atoms, trialkyl phosphites wherein the alkyl groups contain up to 4 carbon atoms, triaryl phosphine wherein the aryl group may be phenyl, tolyl, naphthyl, fluorophenyl and methoxyphenyl and trialkyl phosphines, wherein the alllkyl groups are propyl or butyl, halophosphines such as phenyldichlorophosphine, phosphorustrihalides, phosphorusoxy trihalides, magnesium, manganese and alkali metal hypophosphites, e.g. sodium hypophosphites, and triaryl phosphates, e.g. triphenyl phosphate; tin compounds such as m-butylstannoicacid, dibutyltin oxide, dibutyltin acetate, stannous chloride, stannic chloride, dibutyltin dilaurate, and stannous oxalate; silanes and siloxanes of the formula:

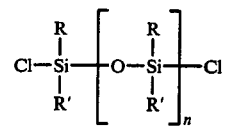

where R and R' may be the same or different and are methyl, phenyl or hydrogen and n is zero or an integer, e.g. up to 5, such as dimethyldichlorosilane, diphenyldichlorosilane, methylphenyldichlorosilane, and 1,3-dichloro-1,1,3,3-tetramethylsilane; organic sulfonic acids such as p-toluenesulfonic acid, benzenesulfonic acid, methanesulfonic acid, trifluoromethanesulfonic acid, and mixtures of the above, halogenated acetic acids as trifluoroacetic acid, and trichloroacetic acid, and mixtures of the above and non-oxidizing acids such as sulfuric acid, phosphoric acid, and hydrochloric acid. The preferred catalyst is triphenyl phosphite.

The process of the invention may be used to produce polybenzimidazoles of one or more aromatic tetraamines and one or more dicarboxylic acids. In general, stoichiometric quantities of the total tetraamine and dicarboxylic components are utilized.

If a catalyst is employed, it is present in an amount, for example, of about 1 to 6 mole %, preferably about 2 to 4 mole % based on the total tetraamine or dicarboxylic acid component.

The first stage of the process of the invention is carried out by heating the aromatic tetraamine, dicarboxylic acid and catalyst, if used, with strong agitation to a temperature in the range of 230°–350° C. and preferably 280°–340° C. Depending on the melting point of the dicarboxylic acid and the chemical nature of the tetraamine and the acid, the liquid mass beingagitated will be a slurry, a homogenous mixture or an emulsion of two immiscible liquids. When the viscosity of the reacting mass begins to rise as indicated by increased torque on the agitator manifested by increased energy of agitation, the agitation is discontinued and the mass heated further and allowed to foam. The point at which the agitation is discontinued is generally such that the agitator torque and energy of agitation has not risen above, for example, about 1000% of the initial torque or agitation energy after the tetraamine has melted, preferably not above about 300% such initial torque or agitation energy. The mass is then heated further without agitation to a temperature in the range, for example, of about 230° to 350° C., preferably about 280° to 340° C. above the melting point of the tetraamine. Such heating is continued for a period of time in the range, for example, of about 0.25 to 3 hours and preferably about 0.5 to 1.5 hours. The foamed mass is then cooled to a temperature below its melting point, e.g. room temperature which causes it to set up into a solid friable mass which is easily crushed or ground. In general, the inherent viscosity of the prepolymer after the first stage is complete is in the range, for example, of about 0.05 to 0.3 dl/g (all inherent viscosities were measured from a solution of 0.4% by weight of polymer in 97% sulfuric acid at 25° C.).

The ground prepolymer is then further heated with normal agitation in a second stage at a temperature, for example, of about 300° to 420° C., preferably about 360° to 400° C. for a period, for example, of about 0.25 to 4 hours, preferably about 0.5 to 2 hours until the desired degree of polymerization is attained.

When poly-2,2'-(m-phenylene)-5,5'-bibenzimidazole is produced from 3,3',4,4'-tetraaminobiphenyl and isophthalic acid using the process of this invention, the first stage may be carried out at a temperature, for example of about 230° to 350° C., preferably about 280° to 340° C. for a period of time, for example of about 0.25 to 3 hours preferably 0.5 to 1.5 hours.

The two stage process of this invention has processing advantages over one stage processes using a free dicarboxylic acid as monomer proposed previously in which the process is carried out with agitation until the viscosity increase overcomes the torque of the stir motor and locks and/or breaks the agitator. The solid polymer produced in this manner is generally in the form of a lump which is difficult to remove from the reactor and difficult to process into shaped articles such as fibers. Moreover, the two stage process generally employed in the polyermization of diphenylisophthalate with 3,3',4,4'-tetraaminobiphenyl in unsuitable when free isophthalic acid is used rather than diphenylisophthalate. Use of isophthalic acid via this process results in polymers of darker color and lower inherent viscosity than those formed with diphenyl isophthalate via this process, or isophthalic acid via the process described in the invention.

In addition to the processing advantages made possible by the two stage process of this invention, the process also results in polymers having relatively high inherent viscosities, which is an indication of molecular weight, and relatively high plugging values which is a filterability measurement indicating the amount of insoluble gels and solid particles present in the polymer.

In both stages of the process of the present invention, a pressure is employed preferably equal to at least atmospheric pressure, e.g., one to two atmospheres, and preferably atmospheric pressure. Such a pressure is commonly obtained by employing an open polymerization system provided with a condenser in order to remove the $H_2O$ which is produced as a by-product of the reaction.

Both stages of the process are conducted in a substantially oxygen-free atmosphere. For example, an inert gas such as nitrogen or argon can be continuously passed through the reaction zone during the polymerization. The inert gas employed should be substantially oxygen-free, i.e., contain less than about 20 p.p.m. of oxygen, preferably less than about 8 p.p.m., and more preferably, be oxygen-free. The inert gas is introduced into the reaction zone at a rate of flow measured at standard conditions, that is, atmospheric pressure and temperature, within the range of about 1 to 200 percent of the volume of the reaction zone per minute. The inert gas can be passed into the polymerization reaction zone at room temperature or, if desired, preheated to the reaction temperature.

The process of the present invention can be used to produce a high molecular weight polybenzimidazole product as indicated by relatively high inherent viscosity. Such products exhibit an inherent viscosity, for example, of at least about 0.4 dl/g when measured at a concentration of 0.4 g. of the polymer in 100 ml. of 97 percent $H_2SO_4$ at 25° C. Preferably, the polymer exhibits an inherent viscosity of at least about 0.5 dl/g, and the inherent viscosity is most preferably at least about 0.6 dl/g.

The following examples further illustrates the invention. The inherent viscosities mentioned in the examples were measured as a 0.4% solution in 97% concentrated sulfuric acid at 25° C. while the plugging values were measured by forming a 5% solution of the polymer in 97% sulfuric acid or a 6% solution in dimethyl acetamide and filtering the solution at 25° C. and one atmosphere pressure through a Gelman Type A gloss paper filter. The plugging value, which is the number of grams of polymer solution filtered per unit area in infinite time, is expressed in grams of polymer per square centimeter. A higher value indicates a polymer solution containing less gels and insolubles.

EXAMPLE I

Into a four-necked, one-liter, round bottomed flask equipped with a nitrogen inlet and outlet, a mechanical stirrer, a thermocouple and a condenser was placed 30.0 g (0.181 mol) of isophthalic acid and 38.7 g (0.181 mol) of 3,3'4,4'-tetraaminobiphenyl and 2.2 g (7.2 mmol) triphenylphosphite. The flask was degassed and filled with nitrogen. The degassing was repeated at least three times. The flask was then heated with an oil bath at 350° C./hr to 300° C. Stirring was maintained at 300 rpm until condensate evolution began to slow and a rapid torque increase on the stir motor was seen. Stirring was terminated when the torque increased to 150 mV from a value before viscosity increase of 30 mV. The oil and polymer temperatures were 270° C. and 242° C., respectively, at this point. The oil bath temperature was increased to 300° C. and held at that temperature for one hour. The foam height in the flask was 10.0 cm. The initial height of reactants in the flask was approximately 1.5 cm. The resulting product was cooled to room temperature and then was ground. The ground prepolymer was placed in a flask, the degassing cycles described above were repeated, and the prepolymer was heated with stirring at 60 rpm at 380° C. for 1.5 hours. The resulting polybenzimidazole exhibited an inherent viscosity of 0.63 dl/g and a dimethylacetamide (DMAc) plugging value (PV) of 1.83 g/cm.

As a control, the polybenzimidazole of this example was prepared according to the procedure described except that agitation of the initial heating step terminated at an oil and polymer temperature of 250° and 222° C., respectively, and agitation was terminated before viscosity began to build as evidenced by constant torque readings on the agitator motor. The first stage foam height was 5.5 cm. The resulting polybenzimidazole exhibited an inherent viscosity of 0.44 dl/g and a dimethylacetamide (DMAc) plugging value (PV) of 1.05 g/cm.

EXAMPLE II

The procedure of Example I was repeated and stirring was terminated when the torque increased to approved 120 mV from a value before viscosity increase of 30 mV. The first stage was heated to 300° C. and held at that temperature for 1 hour. The second stage was heated to 380° C. and held at that temperature for 2 hours. The resulting polybenzimidazole exhibited an inherent viscosity of 0.64 dl/g (measured at 0.4% concentration in sulfuric acid), a dimethylacetamide (DMAc) plugging value (PV) of 6.0 g/cm and a sulfuric acid PV of 0.46 g/cm.

EXAMPLE III

The polybenzimidazole of Example II was repeated except that stirring was terminated when the torque increased to 120 mV from a value before viscosity increase of 30 mV, and the first stage was heated to 280°

C. and held at that temperature for 30 minutes. The second stage was heated to 380° C. and held at that temperature for 60 minutes. The resulting polybenzimidazole exhibited an inherent viscosity of 0.62 dl/g (measured at 0.4% concentration in sulfuric acid), a dimethylacetamide (DMAc) plugging value (PV) of 18 g/cm and a sulfuric acid PV of 0.13 g/cm.

EXAMPLE IV

The procedure of Example II was repeated except that stirring was terminated when the torque increased to 120 mV from a value before viscosity increase of 30 mV, and 3.3 g of triphenylphosphite catalyst was used. The resulting polybenzimidazole exhibited an inherent viscosity of 0.57 dl/g (measured at 0.4% concentration in sulfuric acid), a dimethylacetamide (DMAc) plugging value (PV) of 22 g/cm and a sulfuric acid PV of 0.52 g/cm.

EXAMPLE V

The procedure of Example II was repeated except that stirring was terminated when the torque increased to 120 mV from a value before viscosity increase of 30 mV, and 1.1 g of triphenylphosphite catalyst was used. The resulting polybenzimidazole exhibited an inherent viscosity of 0.40 dl/g (measured at 0.4% concentration in sulfuric acid), a dimethylacetamide (DMAc) plugging value (PV) of 22 g/cm and a sulfuric acid PV of 2.5 g/cm.

COMPARATIVE EXAMPLE A

In a control to show the effect of using isophthalic acid in place of diphenylisophthalate in a two-stage polymerization without the novel reaction conditions disclosed in Examples I-V, isophthalic acid, 3,3',4,4'-tetraaminobiphenyl and triphenylphosphite, in the amount of Example I, were placed in a three-necked, round bottomed flask fitted as in Example II. The flask was degassed and filled with nitrogen three times. The flask was then heated with an oil bath at 350° C./hr to 270° C. Stirring was maintained at 60 rpm until condensate began to evolve, at which time agitation was terminated with substantially no increase in torque. Very little foaming was observed. The 270° C. temperature was held for 1.5 hours. The resulting product was cooled to room temperature and was ground. The ground prepolymer was placed in a flask, degassed and filled with nitrogen three times, and heated with 60 rpm stirring to 360° C. The temperature was held for 1.0 hours. The resulting polybenzimidazole exhibited an inherent viscosity of 0.40 dl/g (measured at 0.4% concentration in sulfuric acid), and a sulfuric acid PV of 0.20 g/cm.

Yields in the foregoing examples were all greater than 90%.

EXAMPLE VI TO XIII

The procedure of Example I was followed except that certain process conditions were varied. These variations and the properties of the polymers obtained are shown in Table I:

TABLE I

| EXAMPLE | 1ST STAGE TEMP (°C.) | 1ST STAGE TIME (hr) | 2ND STAGE TEMP (°C.) | 2ND STAGE TIME (hr) | TPP[1] (mol %) | IV 1[2] (dl/g) | IV 2[3] (dl/g) | ACID PV[4] (g/cm$^2$) | DMAc PV[5] (g/cm$^2$) |
|---|---|---|---|---|---|---|---|---|---|
| VI | 250 | 0.5 | 360 | 1.0 | 2 | 0.09 | 0.37 | 2.5 | 22 |
| VII | 280 | 0.5 | 360 | 1.0 | 2 | 0.11 | 0.37 | 2.5 | 16.9 |
| VIII | 280 | 0.5 | 380 | 1.0 | 2 | 0.13 | 0.37 | 2.5 | 22 |
| IX | 280 | 0.5 | 380 | 1.0 | 4 | 0.12 | 0.62 | 0.13 | 18.0 |
| X* | 280 | 0.5 | 380 | 1.0 | 6 | 0.08 | 0.57 | 0.52 | 22 |
| XI | 300 | 0.5 | 380 | 1.0 | 6 | 0.16 | 0.61 | 0.74 | 22 |
| XII | 320 | 0.5 | 380 | 1.0 | 6 | 0.17 | 0.51 | 0.42 | 22 |
| XIII | 300 | 1.0 | 380 | 1.5 | 4 | 0.16 | 0.61 | 0.37 | 1.9 |
| XIV | 300 | 1.0 | 380 | 2.0 | 4 | 0.19 | 0.63 | 0.43 | 6.9 |
| XV | 300 | 1.0 | 380 | 2.0 | 4 | — | 0.60 | 0.44 | — |
| XVI | 300 | 1.0 | 380 | 1.5 | 4 | 0.17 | 0.65 | 0.39 | 3.8 |
| XVII | 300 | 1.0 | 380 | 1.5 | 4 | 0.17 | 0.64 | 0.65 | 3.7 |
| XVIII | 300 | 1.0 | 380 | 2.0 | 4 | 0.14 | 0.67 | 0.46 | 7.3 |

[1]Triphenylphosphite.
[2]First Stage.
[3]Second Stage.
[4]97% $H_2SO_4$ a filterability measurement.
[5]A filterability measurement with N,N—dimethylacetamide.
*Second Stage Polymer Hardened and Locked Agitator.
NOTE:
For all runs, initial torque was 30–35 mV. Torque at agitation termination was 90–100 mV.

COMPARATIVE EXAMPLE B

First stage foamed prepolymers were synthesized using either (1) isophthalic acid (IPA) according to the procedure in Example II, or (2) diphenylisophthalate (DPIP) according to the procedure in H. Vogel and C. S. Marvel, Journal of Polymer Science, Vol. L., pages 511-539. These materials were compared in Instron compressive crush tests. The average crushing load for the IPA-based foams was 900 to 1000 g. The average crushing load for the DPIP-based foams was 2000 to 3400 g. These results and also the results obtained by crushing a standard type of polyurethane foam are shown in Table 2.

TABLE II

| RUN | MATERIAL | CRUSHING LOAD (g) AVERAGE | CRUSHING LOAD (g) MAXIMUM |
|---|---|---|---|
| 1 | Polyurethane Foam 2 × 2 × .75 | 400 | 1175 |
| 2 | DPIP-Based Foam 2 × 2 × 1 | 2000 | 5000 |
| 3 | DPIP-Based Foam 2 × 2 × 1.5 | 2000 | 4100 |
| 4 | DPIP-Based Foam 1.5 × 1.5 × 1.5 | 2500 | 4700 |
| 5 | DPIP-Based Foam 2.5 × 1.5 × 2 | 3400 | 4700 |
| 6 | IPA-Based Foam 1.5 × 1.5 × 1.5 | 900 | 1400 |
| 7 | IPA-Based Foam | 1000 | 1700 |

TABLE II-continued

| RUN | MATERIAL | CRUSHING LOAD (g) | |
|---|---|---|---|
| | | AVERAGE | MAXIMUM |
| | 1.5 × 1.5 × 1.5 | | |

[1]Instron set at 2"/min, 5000 g full scale. Dimensions are in inches (1 × w × t). DPIP foam made in a 1 l resin kettle at 270° C. for 1.5 hr. IPA-isophthalic acid; DPIP-diphenylisophthalate.

EXAMPLE XIX

Into a three-necked, one-liter, round bottomed flask equipped with a nitrogen inlet and outlet, a mechanical stirrer and a condenser was placed 10.0 g (41.3 mmol) of 4,4'-biphenyldicarboxylic acid, 8.84 g (41.3 mmol) of 3,3',4,4'-tetraaminobiphenyl (TAB) and 0.51 g (1.65 mmol, 4 mol %) triphenylphosphite (TPP). The flask was degassed and filled with nitrogen. The degassing was repeated at least three times. The flask was then heated with an oil bath at 350° C./hr to 280° C. Stirring was maintained at 300 rpm until condensate evolution began to slow the torque increased to 90–100 mV from a value before viscosity increase of 30 mV. The oil bath temperature of 280° C. was held for 30 minutes. The resulting product was cooled to room temperature and then was ground. The inherent viscosity (IV) of this first stage product was 0.15 dl/g. The ground prepolymer was placed in a flask, the degassing cycles described above were repeated, and the prepolymer was heated with stirring at 60 rpm at 380° C. for 30 minutes. The resulting polybenzimidazole exhibited an inherent viscosity of 0.53 dl/g. The yield was 13.2 g (34.5 mmol) or 83%. The polymer was soluble at 6% solids in dimethylacetamide (DMAc)/2% LiCl.

EXAMPLE XX

The procedure of Example XIX was repeated except that 10.0 g (41.3 mmol) of 2,2'-biphenyldicarboxylic acid (diphenic acid) was used instead of 4,4'-biphenyldicarboxylic acid and the torque increased to 90–100 mV from a value before viscosity increase of 30 mV. The first stage IV was 0.12 dl/g and the second stage IV was 0.54 dl/g. The isolated yield was 13.4 g (34.8 mmol) or 84%. The polymer was soluble at 6% solids in dimethylacetamide (DMAc)/2% LiCl.

EXAMPLE XXI

The procedure of Example XX was repeated except that 30.0 g (124 mmol) diphenic acid, 26.5 g (124 mmol) 3,3',4,4'-tetraaminobiphenyl (TAB) and 1.51 g (4.9 mmol, 4 mol%) triphenylphosphite (TPP) was used and the torque increased to 90–100 mV from a value before viscosity increase of 30 mV. The first stage was heated to 300° C. and held for 60 minutes, and the second stage was heated to 380° C. and held for 90 minutes. The resulting polybenzimidazole had an IV 0.61 dl/g and a sulfuric acid plugging value (PV) of 0.53 g/cm$^2$. The isolated yield was 45.1 g (117 mmol) or 95%.

EXAMPLE XXII

The procedure of Example XXI was repeated except that the first stage was heated to 340° C. and held at that temperature for 60 minutes. The second stage was heated to 380° C. and held at that temperature for 90 minutes. The resulting polybenzimidazole exhibited an IV of 0.61 dl/g and a sulfuric acid PV of 0.23 g/cm$^2$. The isolated yield was 41.9 g (109 mmol) or 88%.

EXAMPLE XXIII

The procedure of Example XXI was repeated except that phenylindandicarboxylic acid (PIDA), also identified as 3-[4-carboxyphenyl)-2,3-dihydro-1,1,3-trimethyl-1H-indene-5-carboxylic acid (Chemical Abstract Service registry number 3569-18-4) was used in place of diphenic acid and the torque increased to 90–100 mV from a value before viscosity increase of 30 mV. The weights used were 30.0 g (92.6 mmol) phenylindandicarboxylic acid (PIDA), 19.8 g (92.6 mmol) 3,3',4,4'-tetraaminobiphenyl (TAB) and 1.14 g (3.81 mmol, 4 mol %) triphenylphosphite (TPP). The first stage polymer had an IV of 0.12 dl/g, and the second stage polymer had an IV of 0.63 dl/g and a sulfuric acid PV of 2.5 g/cm$^2$. The isolated yield was 41.4 g (88.8 mmol) or 96%. The polybenzimidazole produced was soluble at 6% solids in dimethylacetamide (DMAc)/2% LiCl.

What is claimed is:

1. A two-stage inert atmosphere melt polymerization process for the preparation of high molecular weight polybenzimidazoles comprising heating in a first stage a mixture of at least one aromatic tetraamine containing two pairs of amine substituents on an aromatic ring in orthoposition and at least one dicarboxylic acid to condensation polymerization temperatures above the melting point of said tetraamine, continuing the heating with agitation until the agitation torque is about 1.5 to about 6 times the torque before the rise in viscosity begins, terminating the agitation while continuing to heat the reaction mixture to a temperature of from 230° to 350° C. while allowing the mass to foam, cooling to a friable foamed mass, crushing the mass to obtain a ground prepolymer and heating the ground prepolymer in a second stage at a temperature in excess of the highest temperature employed in said first stage with agitation until an inherent viscosity in excess of 0.37 is obtained.

2. The process of claim 1 wherein said aromatic tetraamine is 3,3',4,4'-tetraaminobiphenyl.

3. The process of claim 1 wherein said dicarboxylic acid is isophthalic acid.

4. The process of claim 1 wherein said dicarboxylic acid is 4,4'-biphenyldicarboxylic acid.

5. The process of claim 1 wherein said dicarboxylic acid is phenylindandicarboxylic acid.

6. The process of claim 1 wherein a catalyst for the reaction is employed.

7. The process of claim 6 wherein said catalyst is triphenylphosphite.

8. As a new composition of matter, the polybenzimidazole reaction product produced by reacting phenylindandicarboxylic with 3,3',4,4'-tetraaminobiphenyl.

* * * * *